US005522355A

United States Patent [19]

Uhl

[11] Patent Number: 5,522,355

[45] Date of Patent: Jun. 4, 1996

[54] HAND-HELD TOOL DEVICE, ESPECIALLY MOTOR CHAIN SAW

[75] Inventor: Klaus-Martin Uhl, Baltmannsweiler, Germany

[73] Assignee: Andreas Stihl, Waiblingen, Germany

[21] Appl. No.: 360,992

[22] Filed: Dec. 20, 1994

[30] Foreign Application Priority Data

Dec. 31, 1993 [DE] Germany .......................... 43 45 098.9

[51] Int. Cl.[6] ............................ B23D 49/00; B01D 46/10

[52] U.S. Cl. .................................... 123/198 E; 123/195 C

[58] Field of Search ............................ 123/198 E, 195 C, 123/184.21, 593

[56] References Cited

U.S. PATENT DOCUMENTS

| | | | |
|---|---|---|---|
| 3,855,976 | 12/1974 | Notaras et al. | 123/41.7 |
| 3,881,250 | 5/1975 | Frederickson | 30/381 |
| 3,994,067 | 11/1976 | Hazzard et al. | 123/41.65 |
| 4,393,589 | 7/1983 | Barkhult | 30/381 |
| 4,548,169 | 10/1985 | Nagashima | 123/198 E |
| 4,783,207 | 11/1988 | Nagashima et al. | 123/198 E |
| 4,793,303 | 12/1988 | Nagashima | 123/198 E |
| 5,018,492 | 5/1991 | Wolf et al. | 123/198 E |

FOREIGN PATENT DOCUMENTS

| | | | |
|---|---|---|---|
| 2849063 | 5/1980 | Germany . | |
| 3819728 | 1/1989 | Germany | 123/198 E |
| 2274408 | 7/1994 | United Kingdom | 123/198 E |

*Primary Examiner*—David A. Okonsky
*Attorney, Agent, or Firm*—Robert W. Becker & Associates

[57] ABSTRACT

A hand-held tool such as a chain saw has a housing and a combustion engine enclosed in the housing. The working tool is driven by the combustion engine. An air filter box has a filter element for dividing the filter box into a dirt room and a clean room. The air filter box is closed off by a lid. A suction channel connects the clean room to the combustion engine. An air inlet channel for guiding dirt-laden air into the dirt room of the air filter box is provided. The air inlet channel extends substantially straight and upwardly. A suction tube is connected to the suction channel and projects into the clean room for extending the suction channel. The air inlet channel is located in the lid and extends substantially transverse to the suction tube.

16 Claims, 8 Drawing Sheets

HAND-HELD TOOL DEVICE, ESPECIALLY MOTOR CHAIN SAW

BACKGROUND OF THE INVENTION

The present invention relates to a hand-held tool device, especially a motor chain saw, with a combustion engine for driving a working tool arranged in a housing and with an air filter box having a clean room connected via a suction channel to the combustion engine. The clean room is separated by a filter element from the dirt room. The tool device also has a substantially straight upwardly extending air inlet channel through which dirt-laden air enters.

From U.S. Pat. No. 4,393,589 a motor chain saw is known that has an air filter box positioned adjacent to the rearward grip of the device. In the air filter box a filter element separates a clean room from a dirt room. The dirt-laden air is guided via an air inlet channel into the dirt room which extends above the horizontally arranged filter element and enters, after flowing through the filter element, into the carburetor positioned within the clean room. With this device it is possible to achieve a reduction of the suction noise due to the presence of the air inlet channel; however, it is not possible to further reduce the suction noise due to the limited constructive space.

From German Patent 28 49 063 a motor chain saw is known in which for achieving a sufficient noise dampening a plurality of chambers is arranged one after another. However, this results in a disadvantageous enlargement of the constructive size.

It is therefore an object of the present invention to provide for a hand-held tool device an air filter box that has a small constructive volume and achieves with an optimal output adaptation a considerable suction noise reduction.

SUMMARY OF THE INVENTION

A hand-held tool device according to the present invention is primarily characterized by:

A housing;

A combustion engine enclosed in the housing;

A working tool driven by the combustion engine;

An air filter box comprising a filter element for dividing the air filter box into a dirt room and a clean room;

The air filter box comprising a lid;

A suction channel connecting the clean room to the combustion engine;

An air inlet channel for guiding dirt-laden air into the dirt room of the filter box, the air inlet channel extending substantially straight and upwardly;

A suction tube connected to the suction channel and projecting into the clean room for extending the suction channel; and The air inlet channel located in the lid and extending substantially transverse to the suction tube.

Preferably, the filter element is substantially vertically arranged such that a longitudinal center axis of the tool device is substantially perpendicular to the filter element.

Advantageously, the suction tube projects through a plane defined by the filter element.

Preferably, the free end of the suction tube and the air inlet channel overlap.

Expediently, the air inlet channel extends parallel to a plane positioned substantially perpendicular to a longitudinal axis of the suction tube.

Preferably, the air inlet channel opens substantially centrally into the dirt room.

Preferably, the dirt room, viewed in the flow direction of air being sucked in, is positioned above the suction tube.

In another embodiment of the present invention, the air intake of the air inlet channel is located in the proximity of a corner of the air filter box adjacent to a grip of the tool device.

Preferably, the suction tube has a tubular wall and is axially closed and has a suction opening in the tubular wall.

Advantageously, the filter element is fastened to the lid.

Expediently, the lid delimits the clean room of the air filter box.

In a preferred embodiment of the present invention the volume of the air filter box forms a sealed resonance volume.

Preferably, the volume of the clean room forms a sealed resonance volume.

Advantageously, the combustion engine has a carburetor and the air filter box has a sidewall at which the carburetor is arranged.

In a preferred embodiment of the present invention the suction tube and the sidewall are a unitary part.

In another embodiment of the present invention, the air inlet channel is comprised of two parallel inlet lines.

According to the present invention, the suction tube extending into the clean room serves in connection with the resonance volume provided within the air filter box as an efficient measure for dampening suction noise while simultaneously providing for output adaptation of the combustion engine. The air inlet channel, respectively, the inlet lines which are arranged within the lid of the air filter box can be designed in their length and size such that in combination with the resonance volume and the suction tube an efficient dampening effect is achieved. Due to the selected positioning of the air inlet channel relative to the suction tube, the required flow length for a dampening effect can be achieved without increasing substantially the constructive volume of the air filter box.

The filter element extends substantially vertically whereby the longitudinal central axis of the tool device is preferably positioned perpendicular to the filter element. The dirt particles removed from the incoming air thus fall under the effect of gravity to the bottom of the dirt room so that the service life of the air filter is increased.

In order to ensure for a high dampening effect a compact constructive size, the suction tube projects through the plane defined by the filter element. Preferably, the inlet lines of the air inlet channel extend substantially parallel to a plane which is perpendicular to the longitudinal axis of the suction channel. The inlet lines of the air inlet channel which are guided from a lower corner of the air filter box at an angle to the center of the dirt room thus can have a considerable length which is required for an effective dampening of the suction noise.

In a preferred embodiment the suction tube is axially closed and is provided with a radial suction opening in its tubular wall. This ensures that the air-fuel mixture pulsating within the suction channel cannot easily exit into the clean room so that the air filter remains dry and thus has a longer service life.

BRIEF DESCRIPTION OF THE DRAWINGS

The object and advantages of the present invention will appear more clearly from the following specification in conjunction with the accompanying drawings, in which.

DESCRIPTION OF THE PREFERRED EMBODIMENTS

The present invention will now be described in detail with the aid of several specific embodiments utilizing FIGS. 1 through 8.

Figure 1:
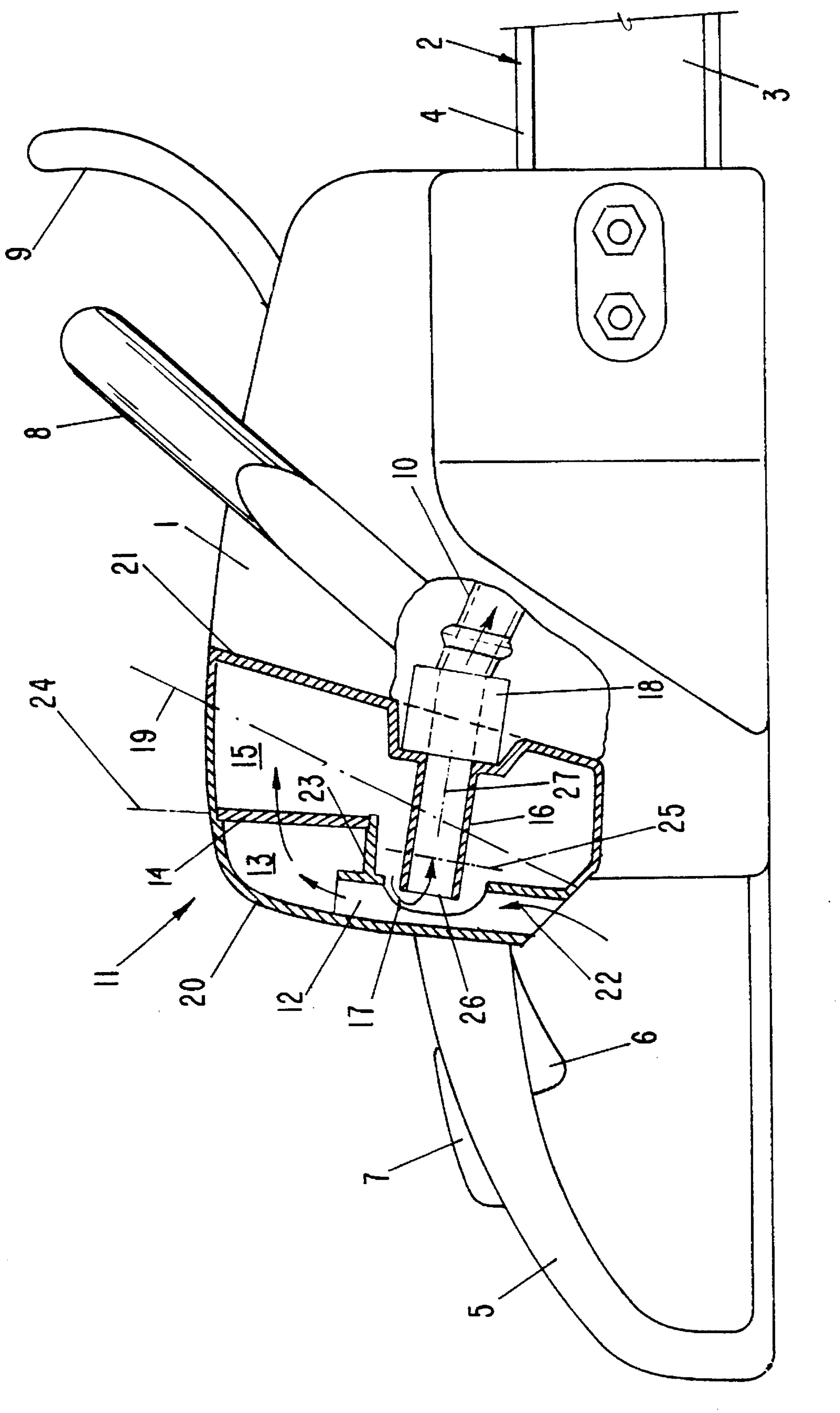
FIG. 1 shows in a schematic representation a motor chain saw with the inventive air filter box.
Figure 2:
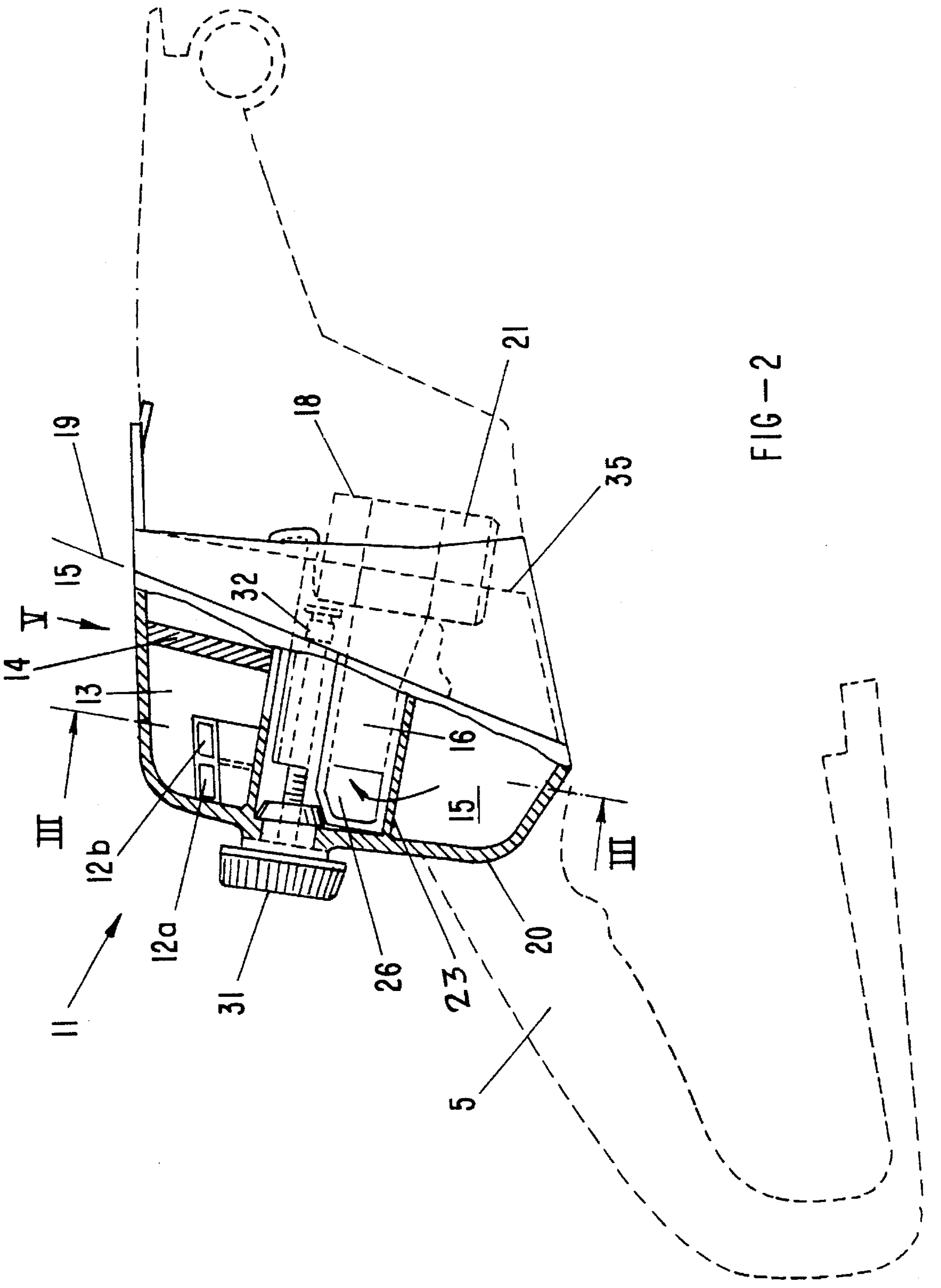
FIG. 2 shows a detail of a hand-held tool device with the inventive air filter box shown in section.

The tool device represented in FIG. 1 is a motor chain saw with a housing 1 in which a non-represented combustion engine is arranged. The combustion engine drives a working tool 2 which in the case of a motor chain saw is formed by a guide rail 3 and a saw chain 4 circulating about it. The saw chain is driven via a centrifugal coupling by a chain pinion driven by the combustion engine. The motor chain saw is provided with a rearward grip 5 having a throttle trigger 6 and a throttle trigger lock 7 coordinated therewith whereby the rearward grip 5 is aligned in the longitudinal direction of the motor chain saw. Above the housing 1 a grip tube 8 is provided which bridges the housing and which serves as the upper grip having coordinated therewith a protective hand bracket 9 for releasing a safety brake device.

The internal combustion engine is connected via a suction channel 10 to the air filter box 11. Via the suction channel 10 the combustion engine sucks in the combustion air required for the operation of the engine. The dirt-laden air enters via an air inlet channel 12 the dirt room 13 which is separated by a filter element 14 from a clean room 15 of the air filter box 11. The filter element in the shown embodiment is a flat filter and the air sucked in flows through the filter over its entire surface area. The filter element 14 is preferably a filter mat which is pressed onto securing pins.

In the shown embodiment, a suction tube 16 extends into the clean room 15 which in the flow direction 17 of the combustion air is arranged upstream of the carburetor 18. The outlet side of the carburetor 18 is connected with the suction channel 10 to the combustion engine. Instead of a carburetor the combustion engine may be provided with an injection pump which injects the fuel directly into the suction channel 10 or, for directly injected combustion engines, into the combustion chamber of the cylinders.

The air filter box 11 has a separation plane 19 along which a lid 20 is separated from the housing part 21. The lid 20 closes the clean room 15 of the air filter box 11. The dirt room 13 is provided within the lid 20 whereby the filter element 14 is fixed by securing pins within the lid 20.

The air inlet channel 12 of FIG. 1 takes in the air 22 in the inner area of the rearward grip 5 where in practice only a low loading with dirt is present. The air flows within the air inlet channel 12 upwardly into the dirt room 13 whereby heavier dirt particles, due to the gravitational force, will stay behind. The dirt particles which are entrained into the dirt room 13 are separated from the air when passing through the filter element 14 and, under the effect of the gravitational force, fall downward onto the bottom 23 of the dirt room 13. This has the advantage that the filter element 14 remains substantially free of big dirt particles so that the service life of the filter element 14 is long.

As represented in FIG. 1, the filter element 14 defines a plane 24 which is penetrated by the suction tube 16. The dirt room 13 is arranged substantially above the suction tube 16 so that the air entering the clean room 15 flows downwardly to the suction tube 16. In the embodiment shown in FIG. 1 the suction opening 26 of the suction tube 16 is facing the backside of the lid 20 which is facing the rearward grip 5. The suction tube 16 is axially open.

The air filter box 11 is adjacent to the rearward grip 5 whereby the suction tube 16 is positioned approximately at the level of the grip 5, respectively, of the throttle trigger 6 or throttle trigger lock 7.

The air inlet channel 12 represented in FIG. 1 is substantially upwardly extending in a straight line whereby the channel 12 is approximately parallel to a plane 25 which is perpendicular to the longitudinal axis 27 of the suction tube 16.

The length and size (volume) of the air inlet channel 12 is selected together with the resonance volume provided by the sealed air filter box 11 and the suction tube 16 for a small constructive size such that the combustion engine is optimally tuned while emitting a low suction noise level.

For achieving a small constructive size, the air inlet channel 12 is arranged transverse to the suction tube 16 preferably at the lid 20 of the air filter box 11 whereby the free end of the suction tube 16 and the air inlet channel 12 overlap one another.

In the embodiment according to FIGS. 2 to 8 the separation plane 19 is also arranged within the clean room 15, corresponding to the schematic representation of FIG. 1. The housing part 21 of the air filter box 11 is preferably a unitary part together with the housing of the motor chain saw whereby the suction tube 16 is a unitary part with the sidewall 35 of the air filter box 11. In the embodiment of FIGS. 2 to 8 the suction tube 16 is axially closed and provided with a radial suction opening 26 in its tubular wall. The suction opening 26 faces away from the two inlet lines **12*a*, 12*b* of the air inlet channel 12. The free end of the suction tube 16 is positioned substantially at the level of the bottom of the lid 20 that is facing the grip 5**.

Figure 3:
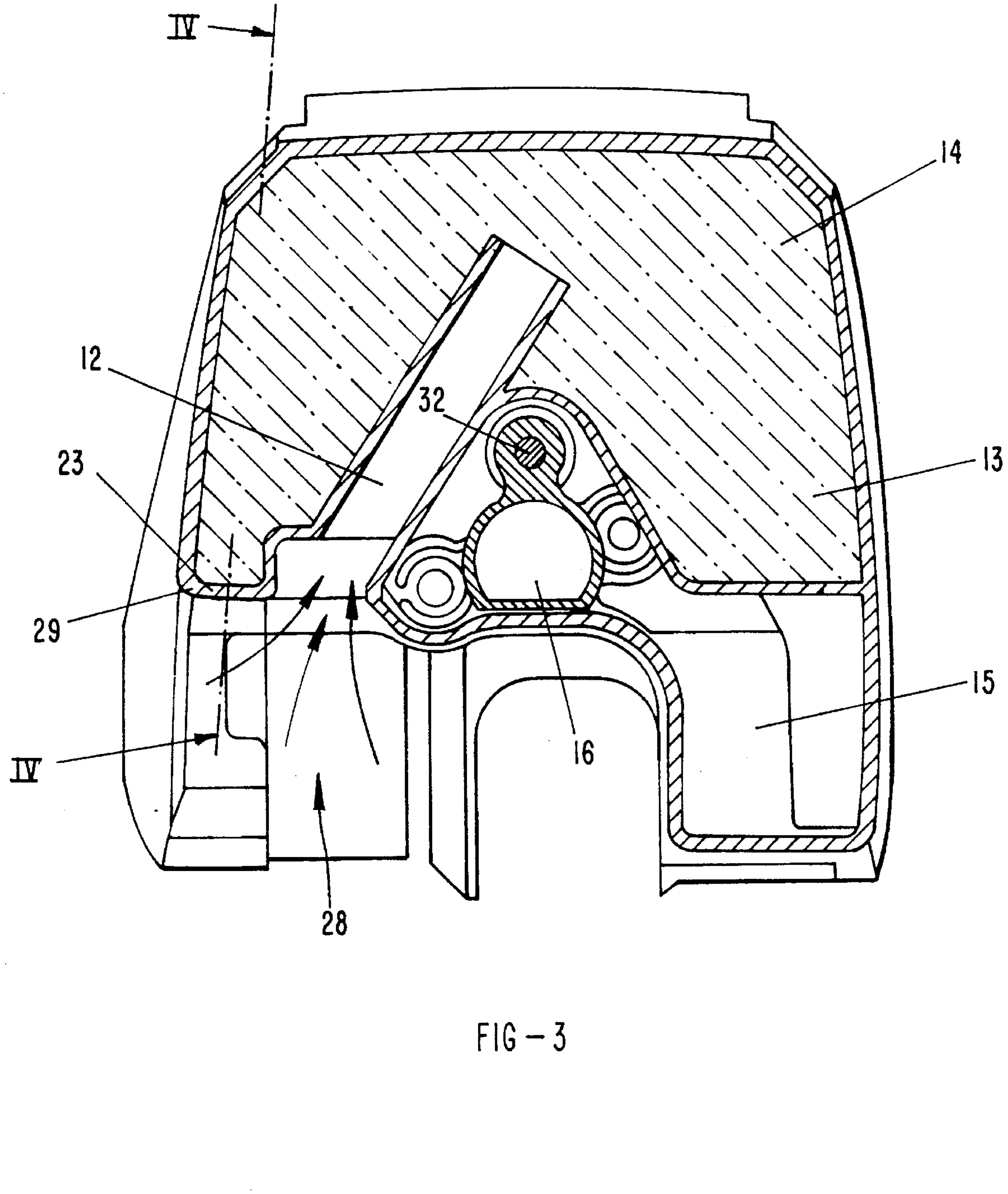
FIG. 3 shows a section along line III—III of FIG. 2.

As shown especially in FIG. 3, the inlet lines **12*a*, 12*b* of the air inlet channel 12 extend from an intake area 28 at a lower corner 29 facing the grip at a slant upwardly to the center whereby the air inlet channel 12 is positioned at an angle of approximately 55° to the horizontal. In the shown embodiment according to FIGS. 2 to 8 two adjacently positioned inlet lines 12*a*, 12*b* are provided that are positioned adjacent to one another in the direction of the depth of the air filter box 11. This means that one of the inlet lines (12*a*) is positioned directly at the bottom of the lid 20 while the other inlet line (12*b*) is positioned at a greater distance to the bottom of the lid 20 adjacent to the first inlet lines 12*a*. The air inlet openings of the inlet lines 12*a*, 12*b* are thus positioned one after another (FIG. 4**) in the direction of the longitudinal axis of the motor chain saw.

Figure 4:
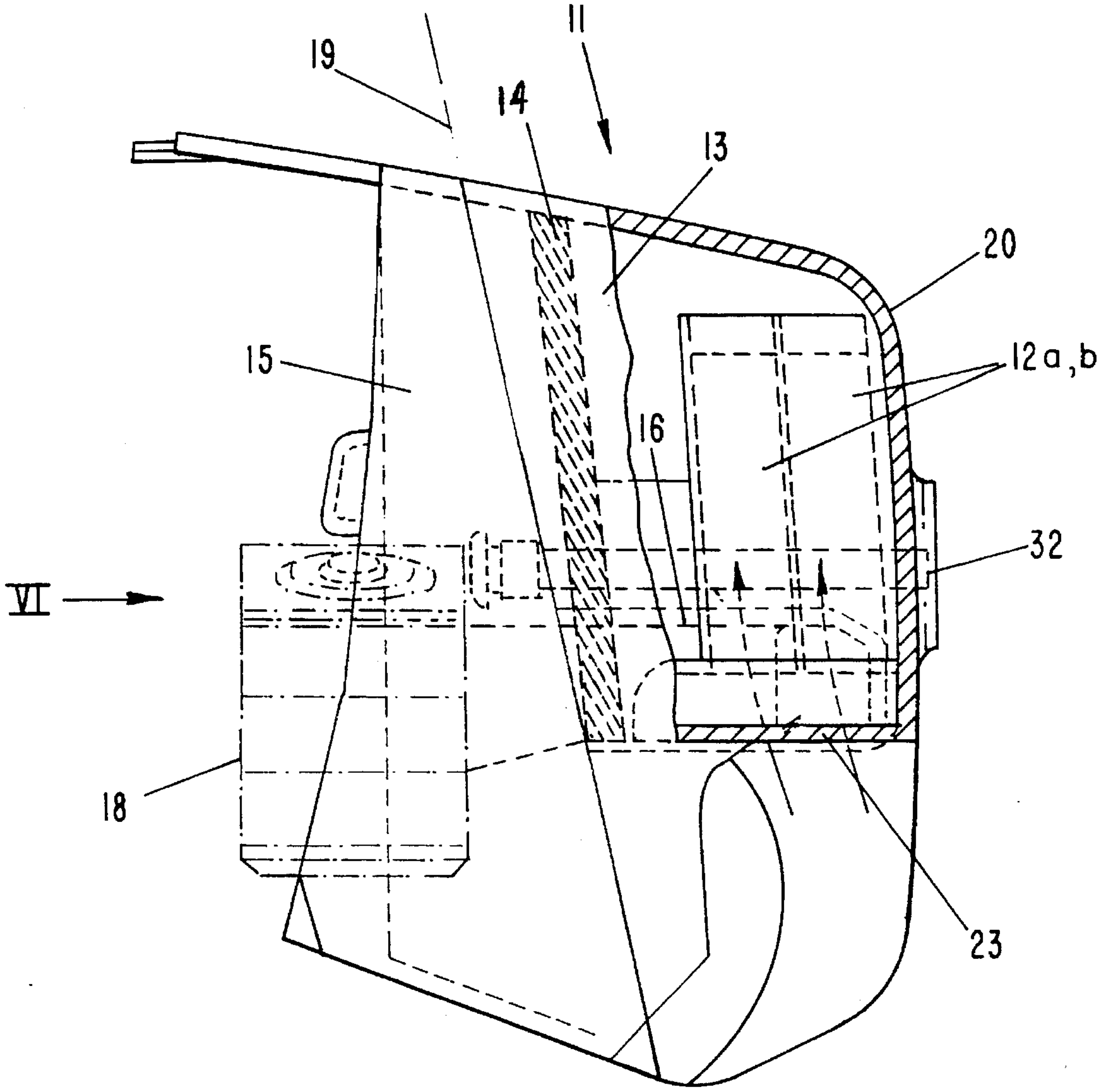
FIG. 4 shows a section along the line IV—IV of FIG. 3.

As can be taken further from FIG. 4, the bottom 23 of the dirt room 13 is arranged as a wall extending substantially perpendicular to the bottom of the lid 20 and projecting into the air filter box 11. The suction tube 16 is positioned underneath the bottom 23 which in its central area is guided upwardly about the suction tube 16. According to FIGS. 2 and 4, an L-shaped clean room 15 results, when viewed in section, which is delimited by the housing part 21 of the air filter box 11, the filter element 14, the bottom 23 of the dirt room 13, and the lower portion of the lid 20. This relatively large volume is designed as a resonance volume in order to block the characteristic frequencies resulting from operating the engine.

Figure 5:
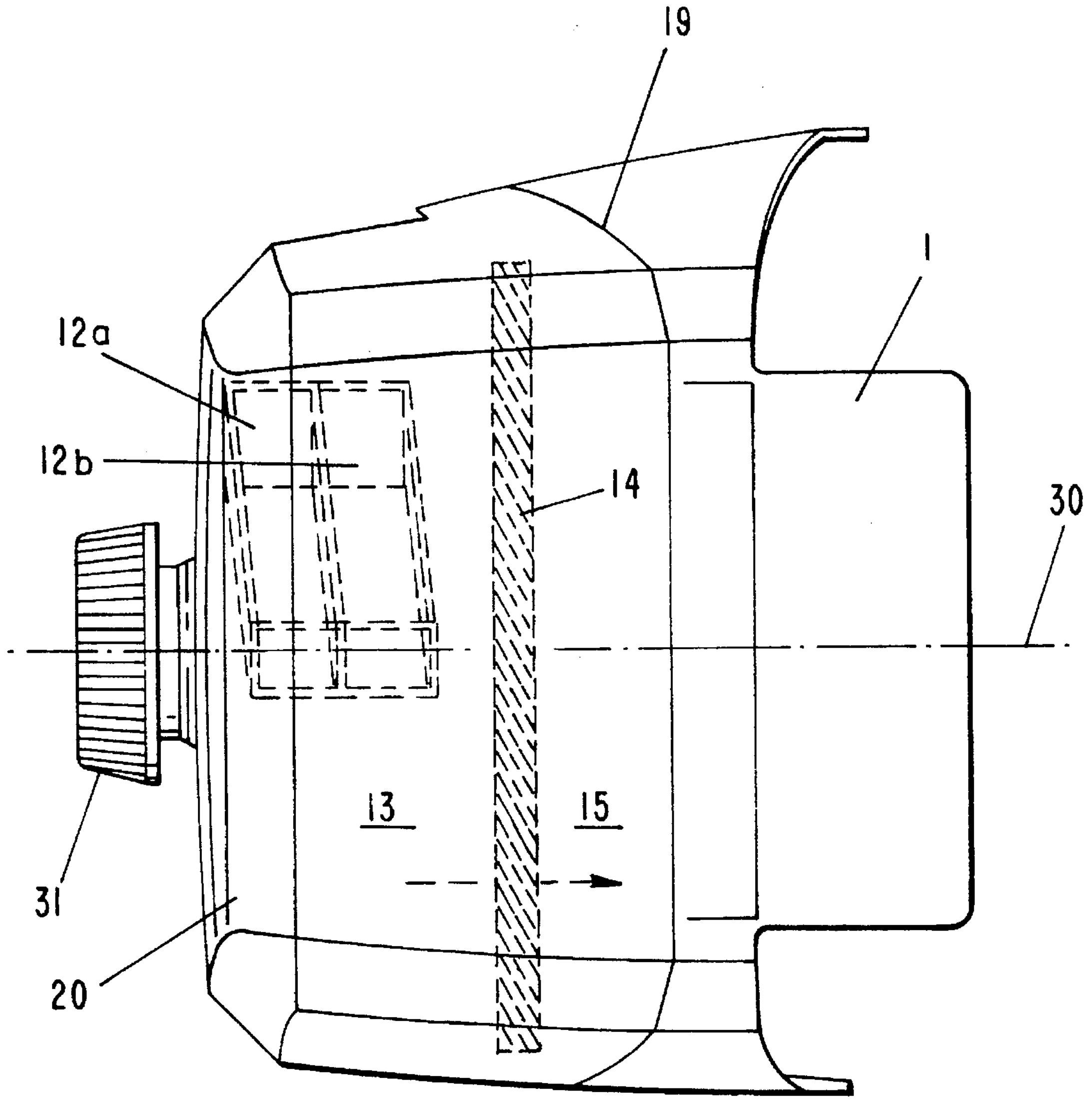
FIG. 5 shows a top view of the inventive air filter box in direction of arrow V of FIG. 2.

In the schematic top view of FIG. 5 the filter element 14, the clean room 15, the dirt room 13 as well as the inlet lines 12*a*, 12*b*, that open at the level of the longitudinal axis 30 of the motor chain saw, are shown. The lid 20 is provided with a turn knob 31 at its bottom which can be threaded onto the bolt 32 (FIG. 4) fixed within the housing part 23 in order to attach the lid 20.

Figure 6:
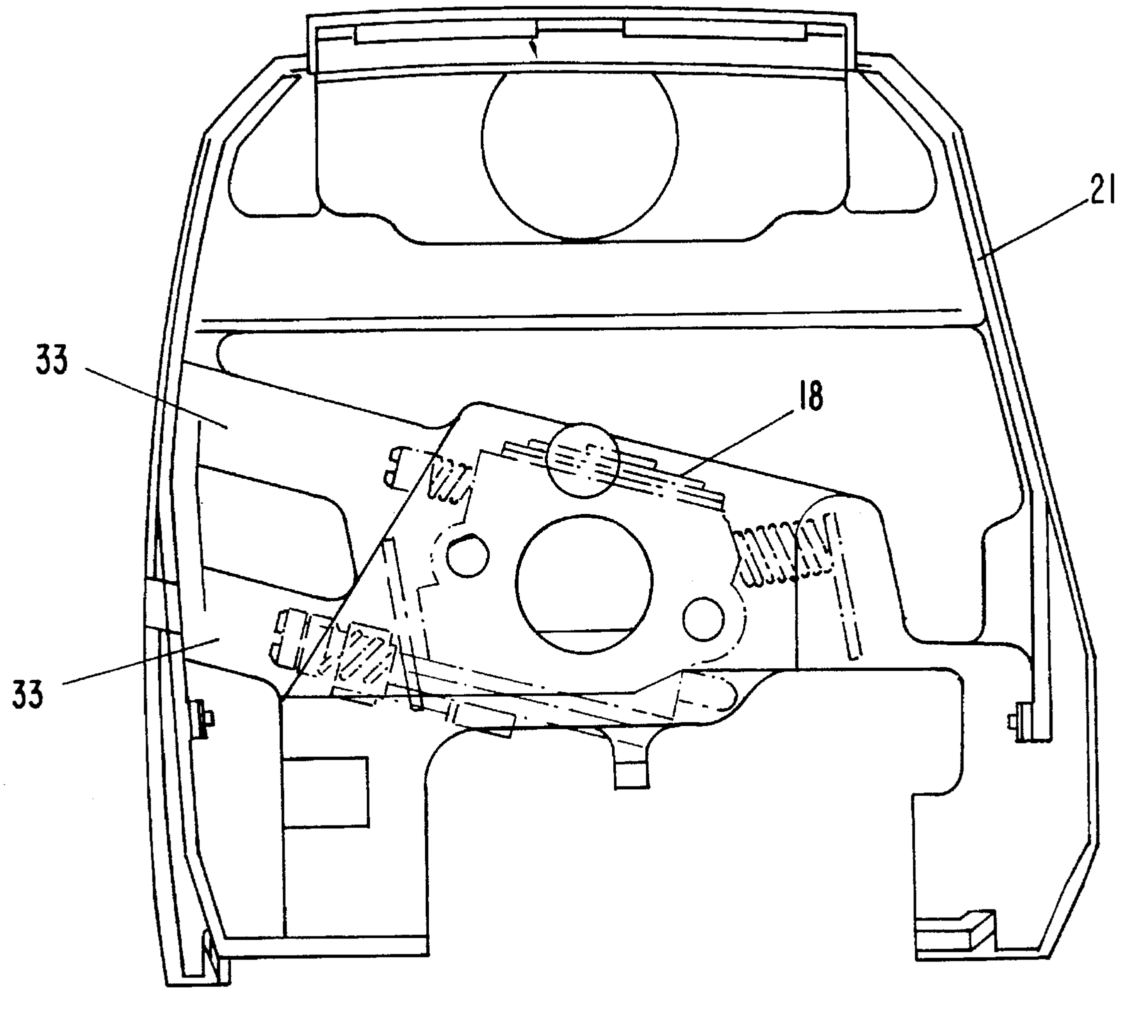
FIG. 6 shows a side view of the housing part of the air filter box in a view in the direction of arrow VI in FIG. 4.
Figure 7:
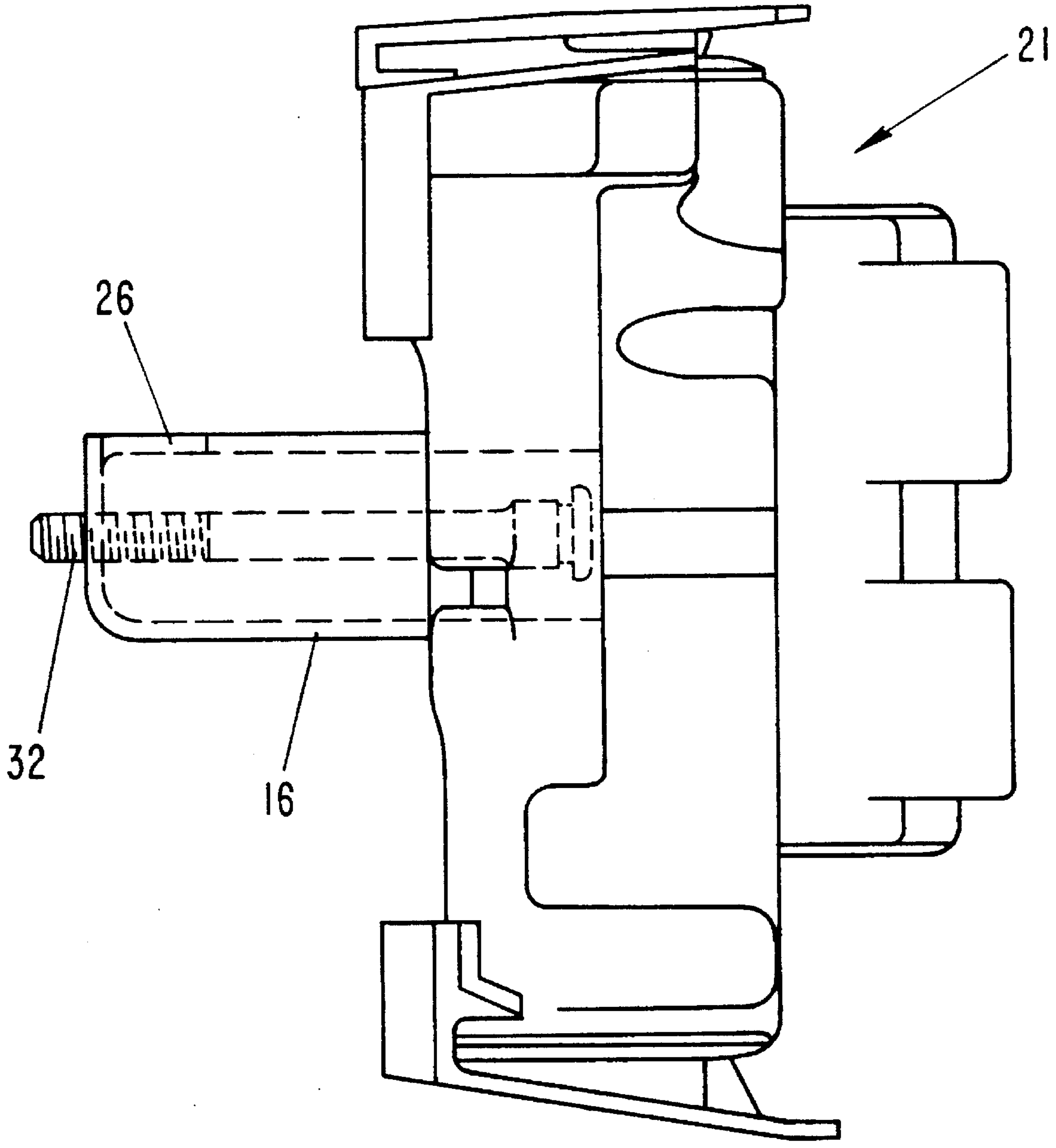
FIG. 7 shows a view of the housing part of the air filter box with the suction tube upstream of the carburetor.

In FIG. 6 it can be seen that the carburetor 18 is connected to the sidewall of the housing part 21 facing the clean room 15. Outwardly open channels 33 are provided in the housing and serve to provide free access to the adjusting screws of the carburetor 18.

Figure 8:
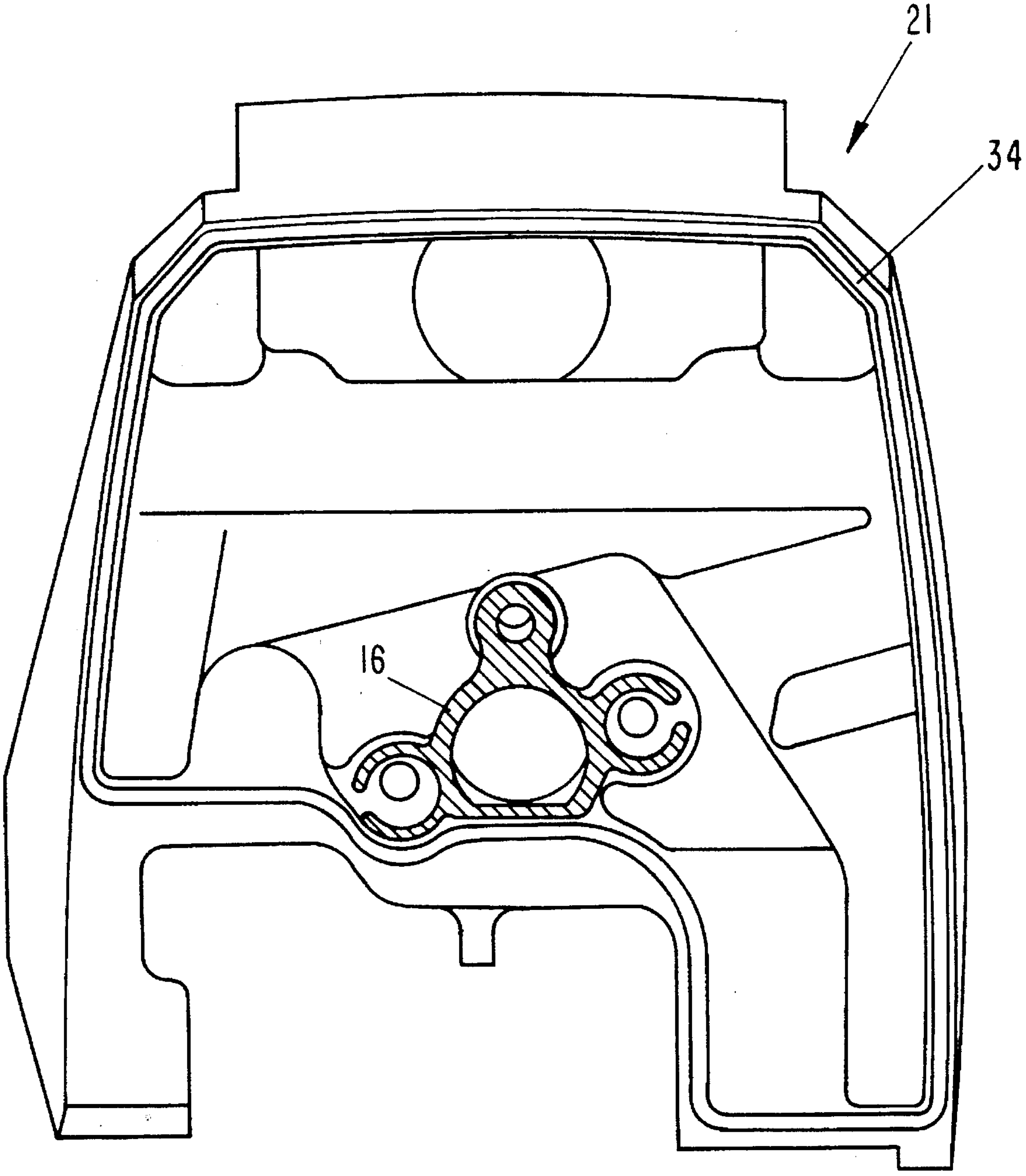
FIG. 8 shows a section along the separation plane of the air filter box.

The housing part 21 of the air filter box 11 viewed from the side of the lid is represented in FIG. 8. The end face of its limiting wall is provided with an inserted sealing rope 34 which is a sealing element for attaching the lid 20 in an air-tight manner. Preferably, for this purpose a tongue-and-groove connection is provided in the area of the sealing edge so that, on the one hand, a fixation of the lid and, on the other hand, a great sealing action is ensured. The suction tube 16 is shown in section in FIG. 8 and is preferably a unitary part together with the housing part 21 of the air filter box 11. In the view from the bottom according to FIG. 7 it is shown that the suction tube 16 is closed at its free axial end and is provided with a radial suction opening 26 in its end section, whereby via the size of this suction opening the output characteristics as well as the suction noise of the engine can be varied. The longitudinal axis of the suction tube 16 as well as the longitudinal axis of the bolt 32 are positioned in the same plane in which preferably also the longitudinal center axis of the tool device is positioned.

The present invention is, of course, in no way restricted to the specific disclosure of the specification and drawings, but also encompasses any modifications within the scope of the appended claims.

What I claim is:

1. A hand-held tool device comprising:

a housing having an upper and a lower end;

a combustion engine enclosed in said housing;

a working tool driven by said combustion engine;

an air filter box comprising a filter element for dividing said air filter box into a dirt room and a clean room;

said air filter box comprising a lid;

a suction channel connecting said clean room to said combustion engine;

an air inlet channel for guiding dirt-laden air into said dirt room of said air filter box, said air inlet channel extending substantially straight and upwardly;

a suction tube connected to said suction channel and projecting into said clean room for extending said suction channel;

said air inlet channel located in said lid and extending substantially transverse to said suction tube.

2. A tool device according to claim 1, wherein said filter element is substantially vertically arranged such that a longitudinal center axis of said tool device is substantially perpendicular to said filter element.

3. A tool device according to claim 1, wherein said suction tube projects through a plane defined by said filter element.

4. A tool device according to claim 1, wherein a free end of said suction tube and said air inlet channel overlap.

5. A tool device according to claim 1, wherein said air inlet channel extends parallel to a plane positioned substantially perpendicular to a longitudinal axis of said suction tube.

6. A tool device according to claim 1, wherein said air inlet channel opens substantially centrally into said dirt room.

7. A tool device according to claim 1, wherein said dirt room, viewed in a flow direction of air being sucked in, is positioned above said suction tube.

8. A tool device according to claim 1, wherein an air intake of said air inlet channel is located in the proximity of a corner of said air filter box adjacent to a grip of said tool device.

9. A tool device according to claim 1, wherein said suction tube has a tubular wall and is axially closed and has a suction opening in said tubular wall.

10. A tool device according to claim 1, wherein said filter element is fastened to said lid.

11. A tool device according to claim 1, wherein said lid delimits said clean room of said air filter box.

12. A tool device according to claim 1, wherein the volume of said air filter box forms a sealed resonance volume.

13. A tool device according to claim 1, wherein the volume of said clean room forms a sealed resonance volume.

14. A tool device according to claim 1, wherein said combustion engine has a carburetor and wherein said air filter box has a sidewall at which said carburetor is arranged.

15. A tool device according to claim 14, wherein said suction tube and said sidewall are a unitary part.

16. A tool device according to claim 1, wherein said air inlet channel is comprised of two parallel inlet lines.

* * * * *